United States Patent
Kimura et al.

(10) Patent No.: US 8,703,621 B2
(45) Date of Patent: Apr. 22, 2014

(54) MANUFACTURING METHOD OF MAGNETIC RECORDING MEDIUM

(75) Inventors: Kaori Kimura, Yokohama (JP); Kazutaka Takizawa, Fuchu (JP); Masatoshi Sakurai, Tokyo (JP); Akihiko Takeo, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/542,072

(22) Filed: Jul. 5, 2012

(65) Prior Publication Data
US 2013/0056441 A1    Mar. 7, 2013

(30) Foreign Application Priority Data
Sep. 7, 2011    (JP) .................................. 2011-195222

(51) Int. Cl.
H01L 21/302    (2006.01)
H01L 21/461    (2006.01)
(52) U.S. Cl.
USPC ......................................... 438/745; 438/754
(58) Field of Classification Search
None
See application file for complete search history.

(56) References Cited

U.S. PATENT DOCUMENTS

2002/0110756 A1*  8/2002  Watanabe et al. ............. 430/319
2011/0220890 A1*  9/2011  Nuzzo et al. .................... 257/49

FOREIGN PATENT DOCUMENTS

| JP | 07-135138 | 5/1995 |
| JP | 08-220771 | 8/1996 |
| JP | 2009-116949 | 5/2009 |
| JP | 2010-146668 | 7/2010 |
| JP | 2010-250872 | 11/2010 |
| JP | 2011-076676 | 4/2011 |

OTHER PUBLICATIONS

Japanese Office Action dated Nov. 20, 2012, filed in Japanese counterpart Application No. 2011-195222. 4 pages (including translation).

* cited by examiner

*Primary Examiner* — Duy Deo
(74) *Attorney, Agent, or Firm* — Patterson & Sheridan

(57) ABSTRACT

A manufacturing method of a magnetic recording medium according to one embodiment includes forming a mask layer having a pattern regularly arranged in a longitudinal direction on a magnetic recording medium containing a substrate and a magnetic recording layer, forming a recording portion having a magnetic pattern and a non-recording portion by patterning the magnetic recording layer, and submitting the mask layer to a peeling liquid to peel the mask layer. The mask layer contains a lamination layer of a lift-off layer, a first hard mask, and a second hard mask. The second hard mask is formed of a material that is different from the material of the first hard disk and the material is dissolvable in the same peeling liquid as the peeling liquid that dissolves the lift-off layer.

9 Claims, 5 Drawing Sheets

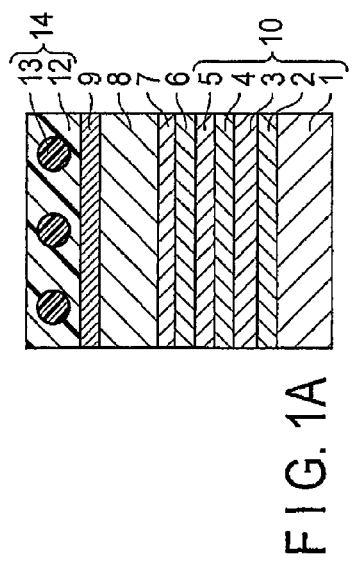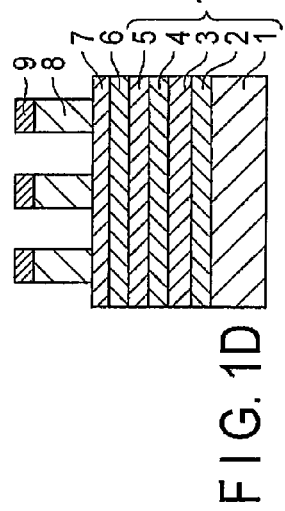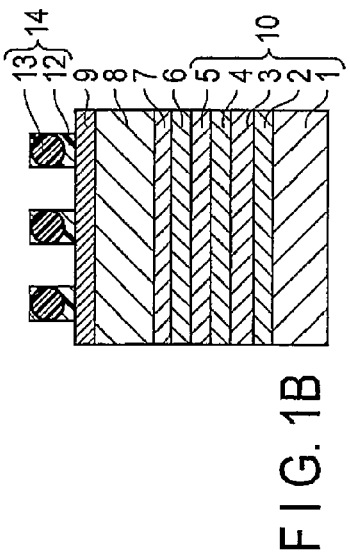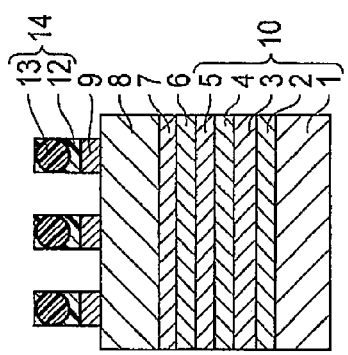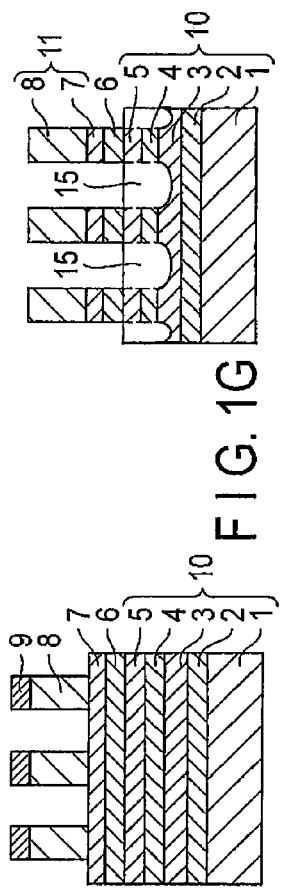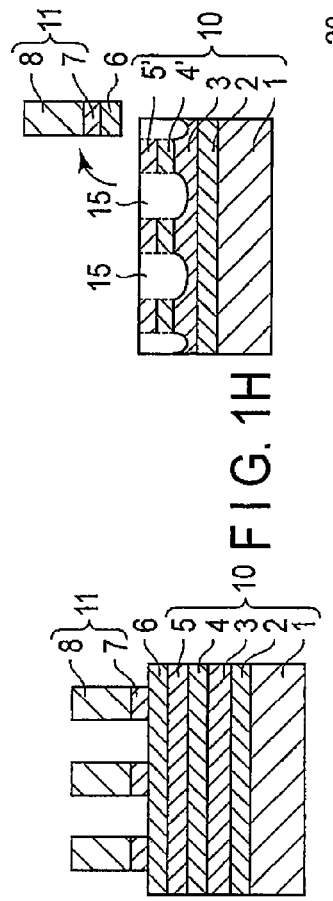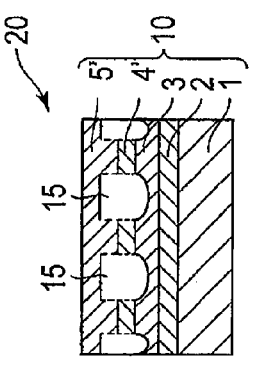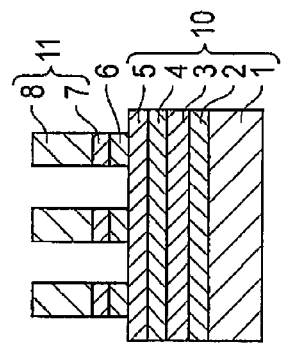
FIG. 1A FIG. 1B FIG. 1C FIG. 1D FIG. 1E FIG. 1F FIG. 1G FIG. 1H FIG. 1I

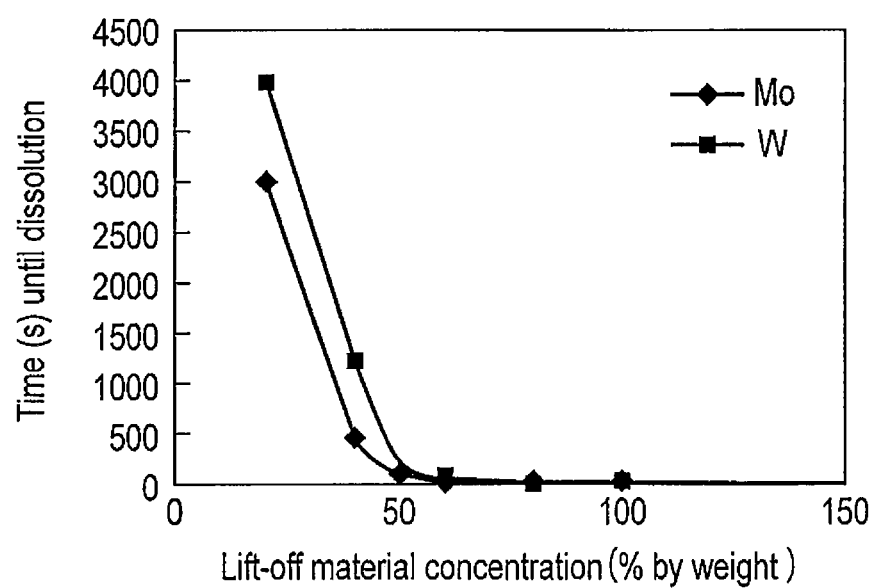
F I G. 6

1

MANUFACTURING METHOD OF MAGNETIC RECORDING MEDIUM

CROSS-REFERENCE TO RELATED APPLICATIONS

This application is based upon and claims the benefit of priority from prior Japanese Patent Application No. 2011-195222, filed Sep. 7, 2011, the entire contents of which are incorporated herein by reference.

FIELD

Embodiments described herein relate generally to a manufacturing method of a magnetic recording medium.

BACKGROUND

In recent years, a dramatic increase in storage capacity of recording media such as hard disks is demanded. In response to such demands, development of magnetic recording media having high storage capacities is under way.

In a magnetic recording medium used in current hard disks, a fixed region of a thin film containing polycrystalline substance of magnetic substance particles is recorded as one bit. To increase the recording capacity of a recording medium, it is necessary to increase the recording density. That is, a recording mark size that can be used for recording per bit needs to be made smaller. However, if the recording mark size is simply made smaller, it becomes impossible to ignore the influence of noise depending on the shape of magnetic substance particles. If the particle size of magnetic substance particles is made smaller to reduce noise, it becomes impossible to keep a record at ordinary temperature due to thermal decay.

To avoid such problems, various patterned media including a bit patterned medium (BPM) that record/read a single magnetic dot as a single recording cell by dividing a recording material by a non-recording material in advance are proposed.

According to a conventional method of producing a patterned medium, a mask having a master pattern equivalent to a desired magnetic pattern is produced on a medium and after the pattern being transferred to a magnetic recording layer, peeling, that is lift-off, of the mask to maintain the smoothness of the surface. Lift-off layers provided in a mask include, for example, a metal layer of Cr, Mo and the like and an organic layer of a resist and the like.

In a patterned medium working process, it is desirable to make the lift-off layer as thin as possible because the lift-off layer is not needed for other processes than peeling. However, if the lift-off layer is thin, peeling defects are more likely to occur when the mask is peeled. For example, peeling is not sufficient in outermost and innermost circumferential regions without any pattern because the surface area of an exposed portion on a side surface to be a penetration location of a peeling liquid is narrow. This also applies to a servo pattern. If a mask peeling defect occurs, a mask of a height of a few tens to 100 nm remains as a protrusion on the medium, making floatability of a head when mounted on a drive worse.

BRIEF DESCRIPTION OF THE DRAWINGS

FIG. 1A is a sectional view schematically showing a manufacturing process of a magnetic recording medium according to a first embodiment;

FIG. 1B is a sectional view schematically showing the manufacturing process of the magnetic recording medium according to the first embodiment;

FIG. 1C is a sectional view schematically showing the manufacturing process of the magnetic recording medium according to the first embodiment;

FIG. 1D is a sectional view schematically showing the manufacturing process of the magnetic recording medium according to the first embodiment;

FIG. 1E is a sectional view schematically showing the manufacturing process of the magnetic recording medium according to the first embodiment;

FIG. 1F is a sectional view schematically showing the manufacturing process of the magnetic recording medium according to the first embodiment;

FIG. 1G is a sectional view schematically showing the manufacturing process of the magnetic recording medium according to the first embodiment;

FIG. 1H is a sectional view schematically showing the manufacturing process of the magnetic recording medium according to the first embodiment;

FIG. 1I is a sectional view schematically showing the manufacturing process of the magnetic recording medium according to the first embodiment;

FIG. 6 is a graph diagram showing a relationship between a concentration of a predetermined element in a lift-off material and a peeling time;

DETAILED DESCRIPTION

Figure 2:
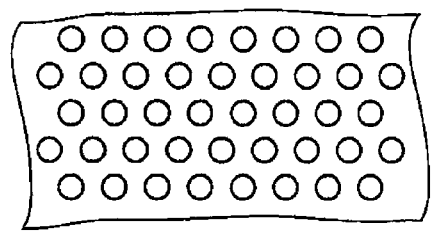
FIG. 2 is a plan view of an example of a magnetic recording medium according to an embodiment.

In general, a manufacturing method of a magnetic recording medium according to one embodiment includes forming a mask layer having a pattern regularly arranged in a longitudinal direction on a magnetic recording medium containing a substrate and a magnetic recording layer provided on the substrate, forming a recording portion having a magnetic pattern and a non-recording portion by patterning the magnetic recording layer via the mask layer, and then submitting the mask layer to a peeling liquid to peel the mask layer.

The mask layer contains a lamination layer of a lift-off layer, a first hard mask, and a second hard mask. The second hard mask is formed of a material that is different from the material of the first hard mask and the material is dissolvable in the same peeling liquid as the peeling liquid that dissolves the lift-off layer.

In the embodiment, if the peeling liquid is applied to the mask layer, the second hard mask can be peeled by the peeling liquid simultaneously with the lift-off layer. According to the configuration, the peeling liquid is also likely to penetrate into a thick mask layer, making peeling defects less likely. Even if a peeling defect occurs because the peeling liquid cannot penetrate into the lift-off layer, the second hard mask higher than the lift-off layer is peeled and the protrusion height of a portion where the peeling defect occurs is sufficiently low compared with a case when the whole mask layer remains, reducing the influence on head floating. Thus, according to the embodiment, a magnetic recording medium with excellent surface property can be obtained.

The embodiments will be described below in detail with reference to drawings.

EXAMPLES

Example 1

FIGS. 1A to 1I show sectional views schematically showing a manufacturing process of a magnetic recording medium according to the first embodiment.

As shown in FIG. 1A, a CoZrNb soft magnetic layer 2 of the thickness of 40 nm is formed on a glass substrate 1 and a ruthenium (Ru) layer of the thickness of 20 nm is formed thereon as an intermediate layer 3. Then, a Co80Pt20 layer of the thickness of 10 nm as a magnetic recording layer 4 and a diamond-like carbon (hereinafter, called DLC) layer of the thickness of 2 nm as a protective film 5 are stacked to obtain a magnetic recording medium 10.

Next, a tungsten (W) layer of the thickness of 5 nm is formed on the protective film 5 of the magnetic recording medium 10 as a lift-off layer 6. Subsequently, a chrome (Cr) layer of the thickness of 3 nm as a first hard mask 7, a W layer of the thickness of 30 nm as a second hard mask 8, and a Cr layer of the thickness of 5 nm as a third hard mask 9 are sequentially formed on the lift-off layer 6.

Then, a self-organizing material PS-PDMS (Polystylene-Polydimethylsiloxane) is stacked on the third hard mask 9 by spin-coating to form a self-organizing material layer 14. After the self-organizing material layer 14 being phase-separated by annealing at 150° C. for 10 h, a state in which balls of a Polydimethylsiloxane (PDMS) phase 13 are arranged in a sea of a Polystylene (PS) phase 12 is generated.

Observation of the self-organizing material layer 14 through a plane SEM shows a pattern in which hexagonally close-packed dots are arranged.

Subsequently, as shown in FIG. 1B, the PS phase 12 that is not protected by the PDMS phase 13 is removed by dry etching to expose the surface of the third hard mask 9. This process is performed by, for example, an inductively coupled plasma (ICP) RIE apparatus by using an oxygen ($O_2$) gas as a process gas and setting the chamber pressure to 0.1 Pa, coil RF power and platen RF power to 100 W and 50 W respectively, and the etching time to 20 sec.

Next, as shown in FIG. 1C, the PDMS phase 13 is used as a mask and the pattern is transferred to the third hard mask 9 formed of Cr to expose the surface of the second hard mask 8. This process is performed by, for example, the inductively coupled plasma (ICP) RIE apparatus by using a $Cl_2/O_2$ gas as a process gas and setting the chamber pressure to 0.5 Pa, coil RF power and platen RF power to 500 W and 50 W respectively, and the etching time to 30 sec.

As shown in FIG. 1D, the patterned hard mask 9 is used as a mask and the pattern is transferred to the second hard mask 8 formed of W to expose the first hard mask 7 in a recess. This process is performed by, for example, the inductively coupled plasma (ICP) RIE apparatus by using a $CF_4/H_2$ gas as a process gas and setting the chamber pressure to 0.1 Pa, coil RF power and platen RF power to 100 W and 30 W respectively, and the etching time to 60 sec.

As shown in FIG. 1E, the patterned second hard mask 8 is used as a mask and the first hard mask 7 formed of Cr is etched to transfer the pattern to expose the surface of the lift-off layer 6 in the recess. This process is performed by, for example, an argon (Ar) ion milling apparatus by using an Ar gas as a process gas and setting the chamber pressure to 0.04 Pa, plasma power to 400 W, the acceleration voltage to 400 V, and the etching time to 10 sec.

As shown in FIG. 1F, the lift-off layer 6 formed of W is etched via a mask layer 11 including the patterned second hard mask 8 and the patterned first hard mask 7 to transfer a pattern to expose the surface of the DLC protective film 5 in the recess. This process is performed by, for example, an argon (Ar) ion milling apparatus by using an Ar gas as a process gas and setting the chamber pressure to 0.04 Pa, plasma power to 400 W, the acceleration voltage to 400 V, and the etching time to 5 sec. Incidentally, the processes in FIGS. 1E and 1F can be performed successively.

As shown in FIG. 1G, ions are implanted in a non-recording portion 15 of the protective film 5 and the recording layer 4 via the DLC protective film 5 to deactivate magnetism of the recording layer 4 in the non-recording portion 15. In the ion implantation, for example, $P^+$ ions are applied with acceleration energy of 7 keV and the processing time lasts for 30 sec with the dose of up to $10^{16}$ atoms/cm$^2$. On the other hand, the region of the recording layer 4 that is covered with the mask layer 11 and is not deactivated becomes a recording portion 4'.

As shown in FIG. 1H, the remaining mask layer 11 is removed together with the lift-off layer 6. This process is performed by, for example, soaking the medium in a hydrogen peroxide solution with a 1% concentration by weight and holding the medium soaked in the solution for 10 min. In this case, not only the lift-off layer 6, but also the second hard mask 8 is dissolved by hydrogen peroxide and thus, if the lift-off layer 6 is not sufficiently dissolved and a peeling defect occurs, the second hard mask 8 can be peeled even if the first hard mask layer 7 remains.

As shown in FIG. 1I, a second protective film 5' is formed by CVD (chemical vapor deposition) and a lubricant is applied thereto to obtain a magnetic recording medium (patterned medium) 20 provided with a magnetic pattern according to the embodiment.

A floating test by mounting a produced patterned medium on a glide tester cleared a floating height of 10 nm. The above result shows that the surface property of a patterned medium produced by the manufacturing method according to the embodiment is excellent.

FIG. 2 shows a plan view of an example of a magnetic recording medium according to an embodiment.

As shown in FIG. 2, equidistant dots are arranged over an almost entire surface of such a magnetic recording medium and each of the dots is magnetically divided. The medium has no patterned servo region and is used by writing a magnetic pattern such as a servo pattern by a servo track writer or magnetic transfer method.

Figure 3:
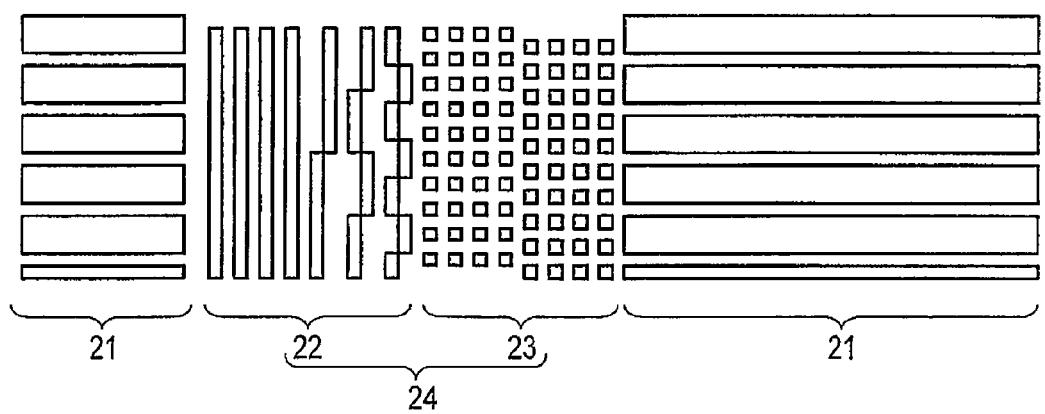
FIG. 3 is a plan view showing an example of an uneven pattern recording information to position a recording track and a record-read head.
Figure 4:
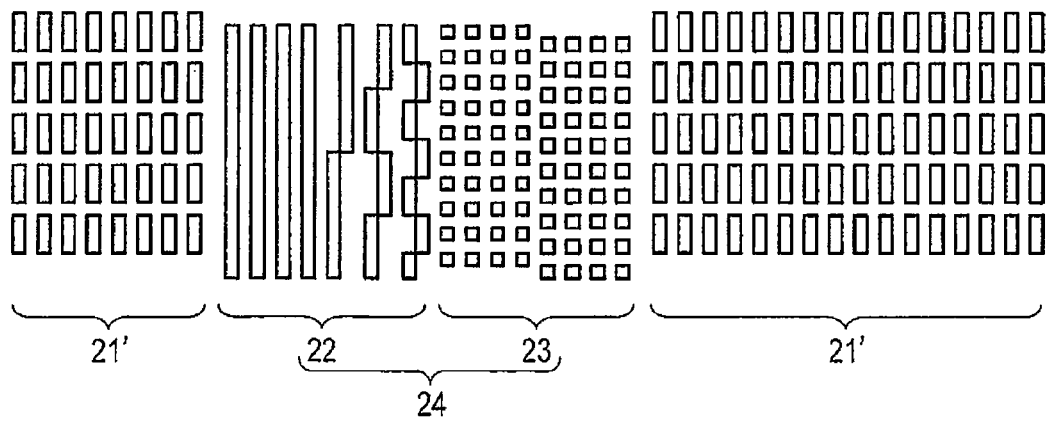
FIG. 4 is a plan view showing another example of the uneven pattern recording the information to position the recording track and the record-read head.

FIG. 3 is a plan view showing an example of a discrete track medium (DTM) pattern recording information to position a recording track and a record-read head and FIG. 4 is a plan view showing an example of a bit patterned medium (BPM) pattern recording the information to position recording bits and the record-read head.

Magnetic patterns include, for example, as shown in FIG. 3, a pattern corresponding to a track pattern 21 provided in a data region and a servo region pattern 24 containing a preamble address pattern 22 and a burst pattern 23 provided in a servo region and, as shown in FIG. 4, a pattern corresponding to a bit pattern 21' provided in the data region and the servo region pattern 24 containing the preamble address pattern 22 and the burst pattern 23 provided in the servo region.

The Lift-Off Layer and the Second Hard Mask

The lift-off layer and the second hard mask may be formed of Mg, V, Mn, Fe, Co, Ni, Zn, Ge, As, Mo, Sb, W, Re, Tl, Pb, alloys formed of these metals, or compounds containing 50 at % or more of components thereof.

If the ratio of other composition exceeds 50 at %, such compounds tend to be indissoluble in a peeling solution. In terms of the peeling rate and ease of etching, Mo and W can be used for the lift-off layer and the second hard mask. The composition of the lift-off layer and the second hard mask may be the same or different.

The thickness of the lift-off layer made thinner in terms of simplicity of the process. However, if the film is too thin, it becomes more difficult for the peeling liquid to penetrate to between the DLC protective film and the first hard mask and thus, an appropriate thickness is needed. From the foregoing, the thickness of the lift-off layer can be set to, for example, 1 nm or more and 10 nm or less, or further 2 nm or more and 7 nm or less.

The thickness of the second hard mask can be decided by a patterning method of a magnetic recording layer. When patterning is performed by ion implantation, the second hard mask desirably has a thickness sufficient to protect only the recording portion because ions are implanted in a depth in which magnetism of the magnetic recording layer can sufficiently be deactivated. In this case, ion implantation shielding properties of the second hard mask material in the embodiment is roughly equivalent to shielding properties of the magnetic recording layer and thus, the second hard mask needs to be at least as thick as the magnetic recording layer. When the magnetic recording layer is patterned by ion milling, the second hard mask does desirably not disappear during milling. In this case, the thickness of the second hard mask depends on resistance to ion milling. If the etching rate of the magnetic recording layer is $V1$ and the etching rate of the second hard mask is $V2$, at least the second hard mask thickness $T2$ can satisfy the relationship $(T2/V2)>(T1/V1)$ from the magnetic recording layer thickness $T1$. Consider the case when, for example, the magnetic recording layer is formed of CoPt and the second hard mask is formed of Mo. In this case, the etching rate of the magnetic recording layer is $V1=1$ nm/sec and the etching rate of the second hard mask Mo is $V2=1.5$ nm. If the thickness of the magnetic recording layer is $T1=10$ nm and the thickness of the second hard mask Mo is $T2=30$ nm, the relationship $(T2/V2)>(T1/V1)$ is satisfied with $T2/V2=20$ and $T1/V1=10$.

Peeling Liquid

A peeling liquid that can dissolve the lift-off layer can be used. The peeling liquid can be selected from solutions of hydrogen peroxide, nitric acid, sulfuric acid, phosphoric acid, boric acid, chromic acid, fluoric acid, hydrogen iodide, hydrogen bromide, formic acid, acetic acid, oxalic acid, and mixtures thereof.

As the peeling liquid, for example, weak acid such as a solution of hydrogen peroxide or formic acid can be used. In a region of high pH, nitric acid, sulfuric acid, or phosphoric acid can also be used. The peeling liquid can have the pH value of 3 to 6. Further, the peeling liquid is a solution of hydrogen peroxide. When acid like hydrochloric acid is used, pores tend to be formed on the surface of a protective film and thus, it becomes necessary to increase the thickness of the protective film.

If the pH value is less than 3, the process cannot be stabilized because the rate of peeling is too fast and if the pH value is more than 6, the dissolution of the lift-off layer tends to be insufficient.

After the magnetic recording layer being patterned, the medium is soaked in a peeling liquid and held in the liquid for few seconds to few minutes. After the lift-off layer and mask sufficiently being dissolved, the surface of the medium is cleaned with pure water and sent to the next process.

First Hard Mask

If the lift-off layer contains Mg, V, Mn, Zn, Ge, As, Mo, Sb, W, Re, Tl, or Pb, the first hard mask can be selected from Al, $AlO_x$ ($0<x\le3/2$), $AlN_x$ ($0<x\le1$), Cr, $CrO_x$ ($0<x\le3/2$), $CrN_x$ ($0<x\le1$), Ni, NiTa, Cu, Ru, and compounds thereof.

An etching rate ratio can be obtained by combining these materials with the second hard mask and the combined materials can be used as an etching stopper to make longitudinal irregularities generated in previous processes uniform.

If the lift-off layer contains Fe, Co, or Ni, the first hard mask can be selected from C, $SiO_2$, $CrO_x$ ($0<x\le3/2$), and $AlO_x$ ($0<x\le3/2$).

An etching rate ratio can be obtained by combining these materials with the second hard mask and the combined materials can be used as an etching stopper to make longitudinal irregularities generated in previous processes uniform.

The first hard mask can be made thinner and to a thickness of 1 nm or more and 10 nm or less.

If the thickness of the first hard mask is less than 1 nm, the hard mask is etched and etching proceeds to the lift-off layer. In such a case, the first hard mask tends to insufficiently function as a stopper. If the thickness of the first hard mask exceeds 10 nm, the first hard mask is too thick and tends to cause mask shape degradation.

Third Hard Mask

If the lift-off layer contains Mg, V, Mn, Zn, Ge, As, Mo, Sb, W, Re, Tl, or Pb, like the first hard mask, the third hard mask can use Al, $AlO_x$ ($0<x\leq3/2$), $AlN_x$ ($0<x\leq1$), Cr, $CrO_x$ ($0<x\leq3/2$), $CrN_x$ ($0<x\leq1$), Ni, NiTa, Cu, Ru or mixtures or compounds thereof can be used. If the lift-off layer contains Fe, Co, or Ni, the third hard mask can use C, $SiO_2$, $CrO_x$ ($0<x\leq3/2$), or $AlO_x$ ($0<x\leq3/2$). A thick second hard mask can be worked out from a thin third hard mask by combining these materials with the second hard mask so that the aspect can be gained.

The third hard mask can be made thin, but if the third hard mask is too thin, sufficient resistance needed to etch the second hard mask cannot be secured. The third hard mask can be set to a thickness of 1 nm or more and 10 nm or less. If the thickness of the third hard mask is 1 nm or less, the mask is useless as a film due to surface roughness and fine pores tend to be formed during etching of the second hard mask. If the thickness of the third hard mask exceeds 10 nm, the pattern transfer from a master pattern tends to become more difficult.

Mastering

A master pattern to be an original of a patterned medium uses an electron beam (EB) pattern forming apparatus and a self-organizing material. According to the EB pattern formation, a fine pattern can be formed in a targeted position. In addition to electron beams, helium ion beams and molecular beams can be used. According to the method using a self-organizing material, a pattern having self-arranging properties by particles or an organic material can be produced in a large area in a short time. A pattern produced by using EB and a self-organizing material can be used as a master to duplicate the pattern by a nano imprint method or an exposuring method by using a stepper. In such a case, the same pattern can be formed at high speed.

Self-organizing Material

For the pattern production, self-organizing materials including PS-PDMS (Polystyrene-Polydimethylsiloxane), PS-PEO (Polystyrene-Polyethylene oxide), and PS-PMMA (Polystyrene-Polymethylmethacrylate), metallic fine particles of $Fe_3O_4$ and the like, inorganic fine particles of $SiO_2$ beads and the like, and $Al_2O_3$ nano-holes are used. If fine particles are used, surroundings thereof are modified by organic matter to make single-layer arrangement easier.

In the embodiment, an organic material called a di-block copolymer mainly represented by PS-PDMS is used. Balls of PDMS are self-organizingly arranged in PS by applying PS-PDMS to a substrate and annealing the substrate at a temperature equal to or higher than the glass transition point.

Self-organizing Material Working

Working of a self-organizing material is to separate PDMS dots in PS from PS and use the PDMS dots as a mask. For PS removal, RIE (reactive ion etching) using an $O_2$ gas is used. As the plasma source, ICP (Inductively Coupled Plasma) capable of generating high-density plasma at low pressure can be used, but ECR (Electron Cyclotron Resonance) plasma or a common parallel plate-type RIE apparatus may also be used. The PS removal is assumed to be complete when the third hard mask below is exposed. Because the selection ratio cannot be gained by a combination of the material to be a master pattern and the third hard mask material and thus, a fourth hard mask may be placed therebetween.

Third Hard Mask Working

Like the PS removal, ICP-RIE can be used to work out the third hard mask. If the third hard mask is formed of Al, $AlO_x$ ($0<x\leq3/2$), $AlN_x$ ($0<x\leq1$), Cr, $CrO_x$ ($0<x\leq3/2$), or $CrN_x$ ($0<x\leq51$), an etching gas containing $Cl_2$ as a main component may be used. For example, $BCl_3$, Ar, $N_2$, or HBr may be mixed with $Cl_2$. If the third hard mask is formed of Ni, NiTa, Cu, or Ru, ion milling using a rare gas including Ar is good. Instead of Ar, a rare gas such as Ne, Kr, and Xe may also be used. If the third hard mask is formed of C, RIE using a gas such as $O_2$, $N_2$, and $H_2$ can be used. If the third hard mask is formed of $SiO_2$, RIE using a fluorine based gas including $CF_4$ can be used. By using these gases for etching, the third hard mask can be worked out at a fast etching rate. Patterning of the third hard mask is assumed to be complete when the surface of the second hard mask is exposed.

Second Hard Mask Working

ICP-RIE can be used to work out the second hard mask. For example, a gas such as $CF_4$, $CF_4/O_2$, $CHF_3$, SF6, and $Cl_2$ may be used. It is also effective to mix a gas such as $H_2$ or $N_2$ because of high tapering. Patterning of the second hard mask is assumed to be complete when the surface of the first hard mask is exposed.

First Hard Mask Working

A method equivalent to the method to work out the third hard mask is used to work out the first hard mask. Ion milling may be used to remove the first hard mask simultaneously with the lift-off layer. Patterning of the first hard mask is assumed to be complete when the surface of the lift-off layer is exposed.

Lift-off Layer Working

Ion milling of a rare gas such as Ar can be used to work out the lift-off layer. The reason therefor is to avoid damage to the magnetic recording layer by a reactive gas. When the ion implantation method is used, all the lift-off layer does not necessarily have to be removed if the surface of the lift-off layer is exposed. Patterning of the lift-off layer is assumed to be complete when the surface of the magnetic recording layer or the magnetic recording layer protective film below is exposed.

Magnetic Recording Layer Patterning

Patterning of the magnetic recording layer is performed by ion implantation or ion milling to demagnetize a portion not to be used for recording.

As shown in FIG. 1A to 1I, magnetism of a portion other than the portion protected by a mask can be deactivated by ion implantation. The deactivation of magnetism here is to increase the concentration of the deactivating element in a non-recording region with respect to a recording region and, as a result, to decrease saturation magnetization Ms. For magnetic deactivation, materials such as H, He, B, C, N, F, Ne, Si, P, S, Ar, Cr, Mn, and As can be used. By using these materials, magnetization can efficiently be decreased. The deactivation effect grows with an increasing composition ratio of the deactivating element, but if the composition ratio is too high, an increase in volume of the medium arises. 1 at % or more and 90 at % or less are desirable for a magnetic element and 5 at % or more and 50 at % or less are more desirable.

Patterning can also be performed by completely removing the non-recording portion by the method such as ion milling. For the ion milling, a rare gas such as Ne, Ar, Kr, and Xe or an inert gas such as $N_2$ can be used. Irregularities arise on a medium when the ion milling method is used and a non-magnetic material may be used for padding.

Protective Film Formation and Post Treatment

A carbon protective film is desirably formed by the CVD method to expand the coverage of irregularities, but may also be formed by the sputtering process or vacuum evaporation method. According to the CVD method, a DLC film containing a large number of $sp^3$ combined carbon atoms is formed. If the thickness thereof is 2 nm or less, the coverage tends to worsen and if the thickness thereof is 10 nm or more, SNR tends to decrease because the magnetic spacing between a record-read head and a medium increases. A lubricant can be applied onto the protective film. As the lubricant, for example, perfluoropolyether, alcohol fluoride, and fluoridated carboxylic acid can be used.

Magnetic Recording Layer

An alloy magnetic recording layer can contain Co or Fe, Ni as a main component and Pt or Pd can also be contained. The magnetic recording layer may also contain Cr or oxide if necessary. Particularly silicon oxide and titanium oxide can be used as the oxide. Further, in addition to oxides, one or more elements selected from Ru, Mn, B, Ta, Cu, and Pd can be contained. By containing the above elements, crystallinity and orientation can be improved so that record-read characteristics and heat fluctuation characteristics appropriate for high-density recording can be obtained.

As a vertical magnetic recording layer, a multilayer structure of a CoPt base alloy, an FePt base alloy, a CoCrPt base alloy, an FePtCr base alloy, CoPtO, FePtO, CoPtCrO, FePtCrO, CoPtSi, FePtSi, or an alloy having at least one element selected from a group of Pt, Pd, Ag, and Cu as a main component together with Co, Fe, or Ni can be used. In addition, an MnAl alloy, SmCo alloy, FeNbB alloy, or CrPt alloy with high Ku can be used.

A vertical magnetic recording layer can be set to a thickness of, for example, 3 to 30 nm and further 5 to 15 nm. If the thickness thereof is in the above range, a magnetic record-read apparatus appropriate for higher recording densities can be produced. If the thickness of the vertical magnetic recording layer is less than 3 nm, the read output is too low and the noise component tends to be higher. If the thickness of the vertical magnetic recording layer exceeds 30 nm, the read output is too high and the waveform tends to be distorted.

Orientation Control Intermediate Layer

An intermediate layer formed of non-magnetic material may be provided between a soft magnetic backing layer and a recording layer.

The intermediate layer has two operations of blocking an exchange coupling interaction between the soft magnetic backing layer and the recording layer and controlling crystallinity of the recording layer. Materials of the intermediate layer include Ru, Pt, Pd, W, Ti, Ta, Cr, Si, Ni, Mg, allows containing these elements, and oxide or nitride of these elements.

Soft Magnetic Underlayer

The soft magnetic underlayer (SUL) carries out a portion of the function of a magnetic head to pass a recording magnetic field from a single magnetic pole head in the horizontal direction for the magnetization of the vertical magnetic recording layer to cause a reflux thereof to the side of the magnetic head and has an operation of improving recording/reading efficiency by causing application of a steep and sufficient vertical magnetic field to the recording layer. A material containing Fe, Ni, or Co can be used for the soft magnetic backing layer. As such materials, an FeCo base alloy such as FeCo and FeCoV, an FeNi based alloy such as FeNi, FeNiMo, FeNiCr, and FeNiSi, an FeAl base alloy, an FeSi base alloy such as FeAl, FeAlSi, FeAlSiCr, FeAlSiTiRu, and FeAlO, an FeTa base alloy such as FeTa, FeTaC, and FeTaN, and an FeZr base alloy such as FeZrN can be cited. In addition, a material having a microcrystal structure such as FeAlO, FeMgO, FeTaN, and FeZrN in which 60 at % or more of Fe is contained or a granular structure in which fine crystalline particles are dispersed in a matrix shape can be used. As another material of the soft magnetic backing layer, a Co alloy containing Co and at least one of Zr, Hf, Nb, Ta, Ti, and Y can be used. A Co alloy can contain 80 at % or more of Co. If such a Co alloy is formed by the sputtering process, an amorphous layer is likely to be formed. An amorphous soft magnetic material does not have magnetocrystalline anisotropy, crystal defects, and grain boundaries and so exhibits very good soft magnetism and can reduce noise of media. As the amorphous soft magnetic material, for example, CoZr, CoZrNb, and a CoZrTa base alloy can be cited.

A foundation layer may further be provided below the soft magnetic backing layer to improve crystallinity of the soft magnetic backing layer or to improve adhesion to the substrate. Materials of the foundation layer include Ti, Ta, W, Cr, Pt, alloys containing these elements, and oxide or nitride of these elements.

To prevent spike noise, the soft magnetic backing layer may be divided into a plurality of layers, which are antiferromagnetically coupled by Ru of 0.5 to 1.5 nm being inserted therebetween. Moreover, a pin layer formed of a hard magnetic film having longitudinal anisotropy such as CoCrPt, SmCo, and FePt or antiferromagnetic substance such as IrMn and PtMn may be exchange-coupled with the soft magnetic layer. To control the exchange coupling force, a magnetic film (for example, Co) or a non-magnetic film (for example, Pt) may be stacked on and beneath the Ru layer.

Comparative Example 1

Patterned media are produced in the same manner as in the first embodiment except that instead of forming the W layer, an Si layer that does not dissolve in hydrogen peroxide is formed as the second hard mask.

A floating test by mounting a patterned medium produced by the above method on a glide tester failed in the glide test because the head crashed near the outermost circumferential region of the medium. Observation of the surface of the medium through an AFM shows a large number of protrusions of the height of around 100 nm, indicating not good surface property of the patterned medium. Analysis of the composition of protrusions shows that Si is the main component, showing that peeling of the hard masks failed. The cause for the failure is considered to be insufficient wetting by the peeling liquid because there is a region where the section of the lift-off layer is not exposed in a wide range due to an occurrence of medium longitudinal etching rate distribution.

Example 2

FIGS. 5A to 5I show sectional views schematically showing a manufacturing process of a magnetic recording medium according to the second embodiment.

Figure 5G:
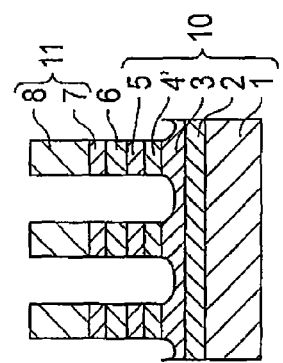
FIG. 5G is a sectional view schematically showing the manufacturing process of the magnetic recording medium according to the second embodiment.
Figure 5H:
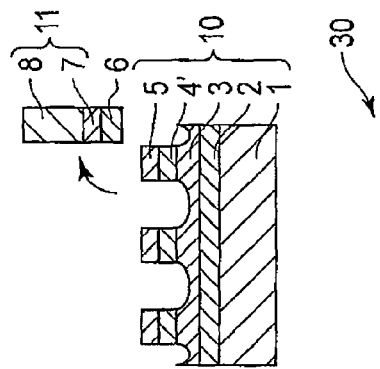
FIG. 5H is a sectional view schematically showing the manufacturing process of the magnetic recording medium according to the second embodiment.
Figure 5I:
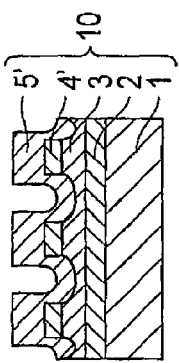
FIG. 5I is a sectional view schematically showing the manufacturing process of the magnetic recording medium according to the second embodiment.
Figure 5D:
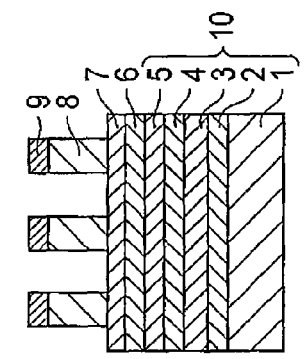
FIG. 5D is a sectional view schematically showing the manufacturing process of the magnetic recording medium according to the second embodiment.
Figure 5E:
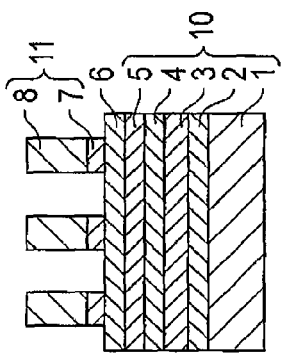
FIG. 5E is a sectional view schematically showing the manufacturing process of the magnetic recording medium according to the second embodiment.
Figure 5F:
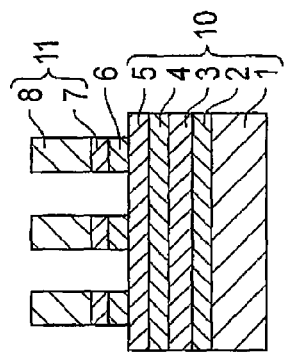
FIG. 5F is a sectional view schematically showing the manufacturing process of the magnetic recording medium according to the second embodiment.
Figure 5A:
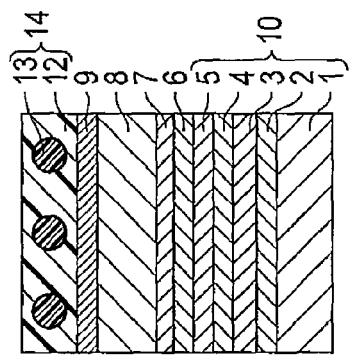
FIG. 5A is a sectional view schematically showing the manufacturing process of a magnetic recording medium according to a second embodiment.

As shown in FIG. 5A, a lift-off layer 6, a first hard mask 7, a second hard mask 8, a third hard mask 9, and a self-organizing material layer 14 are formed on a magnetic recording medium 10 including a glass substrate 1, a soft magnetic layer 2, an intermediate layer 3, a magnetic recording layer 4, and a protective layer 5 in the same manner as in the first embodiment except that the lift-off layer is formed of Mo and the third hard mask is formed of Ni.

Figure 5B:
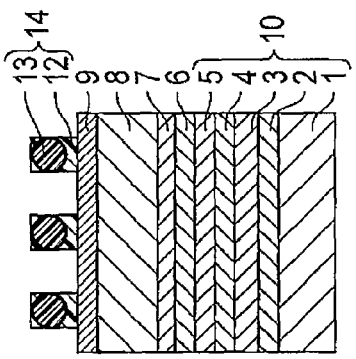
FIG. 5B is a sectional view schematically showing the manufacturing process of the magnetic recording medium according to the second embodiment.

As shown in FIG. 5B, PS of a region not protected by PDMS is removed by dry etching and to expose the surface of the third hard mask. This process is performed by, for example, an inductively coupled plasma (ICP) RIE apparatus by using $O_2$ gas as a process gas and setting the chamber pressure to 0.1 Pa, coil RF power and platen RF power to 100 W and 50 W respectively, and the etching time to 20 sec.

Figure 5C:
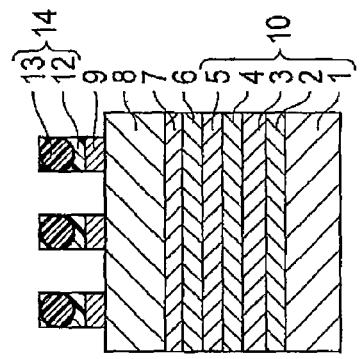
FIG. 5C is a sectional view schematically showing the manufacturing process of the magnetic recording medium according to the second embodiment.

As shown in FIG. 5C, PDMS is used as a mask and the pattern is transferred to the third hard mask formed of Ni to expose the surface of the second hard mask. This process is performed by, for example, an inductively coupled plasma (ICP) RIE apparatus by using an Ar gas as a process gas and setting the chamber pressure to 0.05 Pa, coil RF power and platen RF power to 100 W and 100 W respectively, and the etching time to 10 sec.

In FIGS. 5D and 5E, like in Example 1, the patterned third hard mask 9 is used as a mask and a pattern is transferred to the second hard mask 8 formed of W to expose the first hard mask 7 in a recess and then, the patterned second hard mask 8 is used as a mask and the first hard mask 7 formed of Cr is etched to transfer a pattern to expose the surface of the lift-off layer 6 in the recess.

As shown in FIG. 5F, the lift-off layer 6 formed of Mo is etched by using the patterned second hard mask 8 and the patterned first hard mask 7 as masks to transfer a pattern to expose the surface of the DLC protective film 5 in the recess. This process is performed by, for example, an argon (Ar) ion milling apparatus by using an Ar gas as a process gas and setting the chamber pressure to 0.04 Pa, plasma power to 400 W, the acceleration voltage to 400 V, and the etching time to 5 sec.

As shown in FIG. 5G, the recording layer 4 in the recess is all etched together with the protective film 5 by Ar ion milling. This process is performed by, for example, setting the chamber pressure to 0.04 Pa, plasma power to 400 W, the acceleration voltage to 400 V, and the etching time to 30 sec. The region of the recording layer 4 that is covered with a mask layer 11 and is not etched becomes a recording portion 4'.

A series of processes of FIGS. 5E to 5G may be performed successively.

As shown in FIG. 5H, the remaining second hard mask (W) is removed simultaneously with the lift-off layer (Mo). This process is performed by, for example, soaking the medium in a hydrogen peroxide solution with a 1% concentration by weight and holding the medium soaked in the solution for 10 min. In this case, not only the lift-off layer 6, but also the second hard mask 8 is dissolved by hydrogen peroxide and thus, if the lift-off layer 6 is not sufficiently dissolved and a peeling defect occurs, the second hard mask 8 can be peeled even if the first hard mask 7 remains.

As shown in FIG. 5I, a second protective film is formed by CVD and a lubricant is applied thereto to obtain a patterned medium 30 according to the embodiment.

A floating test by mounting a produced patterned medium on a glide tester cleared a floating height of 10 nm. The test shows that the surface property of a patterned medium produced by the manufacturing method of the present patent is excellent.

Example 3

Patterned media are produced by the same method as in Example 1.

However, second mask materials are changed to Mg, V, Mn, Fe, Co, Ni, Zn, Ge, As, Mo, Sb, W, Re, Tl, and Pb for each and the respective thickness is set to 30 nm. The lift-off layer is fixed to the thickness of 5 nm and formed of W.

Table 1 shows results of the floating test carried out by mounting a produced patterned medium on a glide tester and changing the floating height to 10 nm or 15 nm.

In the table, OK indicates a glide pass and Δ indicates few hits. It is clear from the results that a medium with excellent floatability can be produced in the configuration according to the embodiment.

TABLE 1

|  | Example 3 | | | | | | | | | | | | | | | Comparative Example 1 |
| --- | --- | --- | --- | --- | --- | --- | --- | --- | --- | --- | --- | --- | --- | --- | --- | --- |
|  | Mg | V | Mn | Fe | Co | Ni | Zn | Ge | As | Mo | Sb | W | Re | Tl | Pb | — |
| 15 nm | OK | OK | OK | OK | OK | OK | OK | OK | OK | OK | OK | OK | OK | OK | OK | NG |
| 10 nm | OK | OK | OK | OK | Δ | Δ | OK | Δ | Δ | OK | Δ | OK | Δ | Δ | Δ | NG |

If the second mask material is fixed to Mo and the lift-off layer material is changed to Mg, V, Mn, Fe, Co, Ni, Zn, Ge, As, Mo, Sb, W, Re, Ti, and Pb, though more Δ are observed in glide test results when the floating height is 10 nm, the glide test results are OK for the most part and results similar to Table 1 are obtained.

Example 4

Regarding the lift-off layer material, the relationship between the content in the lift-off layer and the time needed for peeling is investigated.

Patterned media are produced by the same method as in Example 1, the lift-off layer is set to Mg, V, Mn, Fe, Co, Ni, Zn, Ge, As, Mo, Sb, W, Re, Tl, and Pb, and the thickness thereof is set to 5 nm. The second mask layer is formed of Mo and fixed to the thickness of 30 nm.

The time needed until peeling occurs in 95% or more of the whole area is investigated for each lift-off layer. Results of the investigation are as shown in Table 2 below.

TABLE 2

|  | Example 4 Material | | | | | | | | | | | | | | |
| --- | --- | --- | --- | --- | --- | --- | --- | --- | --- | --- | --- | --- | --- | --- | --- |
|  | Mg | V | Mn | Fe | Co | Ni | Zn | Ge | As | Mo | Sb | W | Re | Tl | Pb |
| Time [sec] | 800 | 650 | 450 | 2000 | 2000 | 1200 | 500 | 1000 | 3000 | 300 | 1500 | 200 | 1500 | 2500 | 800 |

As shown above, particularly excellent peelability is observed when Mo and W are used. This can be considered to be a result of not only dissolvability as a material, but also reactions with upper and lower layers and compatibility with working processes.

Example 5

Regarding the lift-off layer material, the relationship between the content in the lift-off layer and the time needed for peeling is investigated. More specifically, a mixture of C and the lift-off layer material is stacked on a substrate to a thickness of 10 nm and the mixture is dissolved in a hydrogen peroxide solution with a 1% concentration by weight to investigate the time needed for peeling. Results thereof are summarized in FIG. 6.

FIG. 6 is a graph diagram showing the relationship between the concentration of a predetermined element in the lift-off material and the peeling time.

It is evident from FIG. 6 that the time needed for peeling increases rapidly when material concentration falls below around 50 at %. This trend is the same for other lift-off materials and peeling liquids. As described above, the concentration of the lift-off material can be set to 50 at %.

Example 6

Regarding the lift-off layer, the relationship between the thickness and peelability is investigated. More specifically, patterned media are produced by the same method as in Example 1 and the lift-off layer formed of W is set to thicknesses of 0.5 nm, 1 nm, 2 nm, 3 nm, 5 nm, 7 nm, 10 nm, and 15 nm, after a recording layer being worked out, the patterned media are soaked in a hydrogen peroxide solution to peel the lift-off layer by the same method as in Example 1.

Peeling results are evaluated with ○ if no peeling defect is found when investigated by an optical microscope, Δ if 1 to 10 peeling defects are found, and NG if 11 or more peeling defects are found.

Results of the investigation are summarized as shown in Table 3 below.

TABLE 3

|  | Lift-off layer thickness | Peeling | Glide |
|---|---|---|---|
| Example 6 | 0.5 nm | NG | 15 nm Δ |
|  | 1 nm | Δ | 12 nm OK |
|  | 2 nm | Δ | 10 nm OK |
|  | 3 nm | Δ | 10 nm OK |
|  | 5 nm | ○ | 10 nm OK |
|  | 7 nm | ○ | 12 nm OK |
|  | 10 nm | ○ | 12 nm OK |
|  | 15 nm | ○ | 15 nm Δ |

When the lift-off layer has the thickness of 0.5 nm, peeling is evaluated with Δ and glide characteristics are also evaluated with Δ. This can be considered to result from the fact that the lift-off layer is too thin for a peeling liquid to penetrate between layers. Results when the thickness is 1 to 3 nm are partially peeling NG, but hits are few and the evaluation thereof is Δ. This can be considered to be a manifestation of an effect of being able to peel a mask at the same time. Peelability becomes better when the thickness is 5 nm or more, but glide characteristics become worse when the thickness is 7 nm or more and the evaluation thereof becomes Δ when the thickness is 15 nm. Measurement of the sectional TEM of the medium whose glide characteristics are evaluated as Δ shows that variations of irregularities of the medium are large. The cause therefor can be considered to be working variations due to an increased etching time in a state without a process stopper after the lift-off layer becomes thicker.

The above result shows that it is desirable to make the lift-off layer as thin as possible within the range in which the lift-off layer can be peeled.

This trend is the same for other lift-off materials.

Example 7

A patterned medium is produced by the same method as in Example 1. However, the combination of the first hard mask (stopper) and the mask material is changed as shown in Table 4 below.

TABLE 4

|  | Second hard mask (main mask) | First hard mask (stopper) | Glide |
|---|---|---|---|
| Example 7 | Mo | Al | 12 nm OK |
|  | Mo | $AlO_x$ ($0 < x \leq 3/2$) | 15 nm OK |
|  | Mo | $AlN_x$ ($0 < x \leq 1$) | 15 nm OK |
|  | W | Cr | 10 nm OK |
|  | W | $CrO_x$ ($0 < x \leq 3/2$) | 12 nm OK |
|  | W | $CrN_x$ ($0 < x \leq 1$) | 12 nm OK |
|  | Mo | Ni | 10 nm OK |
|  | Mo | NiTa | 10 nm OK |
|  | W | Cu | 12 nm OK |
|  | W | Ru | 10 nm OK |
|  | Ni | C | 12 nm OK |
|  | Co | $SiO_2$ | 15 nm OK |
|  | Fe | $CrO_x$ ($0 < x \leq 3/2$) | 15 nm OK |
|  | Ni | $AlO_x$ ($0 < x \leq 3/2$) | 15 nm OK |

It is evident that media with excellent glide characteristics can be produced even if the first hard mask material is changed as shown above. The trend is the same if the second hard mask material is changed to Mg, V, Mn, Fe, Co, Ni, Zn, Ge, As, Mo, Sb, W, Re, Tl, and Pb.

Example 8

Comparative Example 2

Peelability of the second hard mask and the lift-off layer is investigated by changing the peeling liquid. Media are produced by the same method as in Example 1 and peeling is performed by using solutions with a 1% concentration by weight of, in addition to hydrogen peroxide, nitric acid, sulfuric acid, phosphoric acid, boric acid, chromic acid, fluoric acid, hydrogen iodide, hydrogen bromide, formic acid, acetic acid, and oxalic acid. Because the level of degradation of the recording layer by acid is investigated, no soft magnetic layer is stacked on the media.

As Comparative Example 2, peeling by a solution with a 1% concentration by weight of hydrochloric acid is prepared.

Each medium is worked out and mounted on a drive to evaluate glide characteristics. A saturation magnetization amount Ms by VSM is measured to compare the measured amount with a value before patterning. Because the dot region deposition after patterning is 23% of the deposition before patterning, Ms below 23% can be estimated to be damage. Ms measurement results are summarized in Table 5 below.

TABLE 5

| | Peeling liquid | Glide | Ms (%) |
|---|---|---|---|
| Example 8 | Hydrogen peroxide | 10 nm OK | 22 |
| | Nitric acid | 10 nm OK | 20 |
| | Sulfric acid | 10 nm OK | 19 |
| | Phosphoric acid | 10 nm OK | 21 |
| | Boric acid | 12 nm OK | 20 |
| | Chromic acid | 12 nm OK | 18 |
| | Fluoric acid | 15 nm OK | 17 |
| | Hydrogen iodide | 10 nm OK | 19 |
| | Hydrogen bromide | 12 nm OK | 21 |
| | Formic acid | 10 nm OK | 19 |
| | Acetic acid | 12 nm OK | 18 |
| | Oxalic acid | 15 nm OK | 18 |
| Comparative Example 2 | Hydrochloric acid | 10 nm OK | 2 |

From the above results, it is clear that, excluding hydrochloric acid in Comparative Example 2, glide characteristics and the saturation magnetization amount are comparable values. The above results show that these acids can be used as a peeling layer. Measurement of sectional TEM of the medium using hydrochloric acid shows fine pores in the medium. This can be assumed to be a result of the erosion of the protective film by hydrochloric acid.

Example 9

Figure 7A:
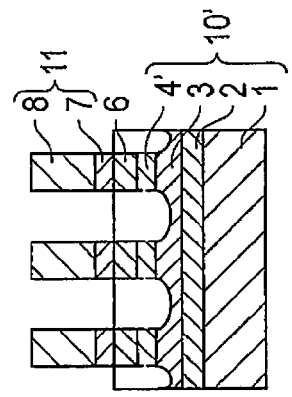
FIG. 7A is a sectional view schematically showing the manufacturing process of a magnetic recording medium according to a third embodiment.

FIGS. 7A to 7F show sectional views schematically showing the manufacturing process of a magnetic recording medium according to the third embodiment;

As shown in FIG. 7A, a magnetic recording medium 10' including a CoZrNb soft magnetic layer 2 of the thickness of 40 nm, an Ru intermediate layer 3 of the thickness of 20 nm, and a $Co_{80}Pt_{20}$ magnetic recording layer 4 is created on a glass substrate 1.

An Mo layer of the thickness of 5 nm as a lift-off layer 6, a Cr layer of the thickness of 3 nm as a first hard mask 7, and a W layer of the thickness of 30 nm as a second hard mask 8 are formed on the magnetic recording layer 4. Ni fine particles 17 whose surface is modified by an organic chain such as a carboxyl group, amino group, and carbonyl group is arranged on the second hard mask 8 as a single layer.

Figure 7B:
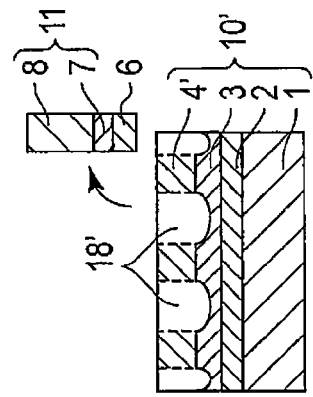
FIG. 7B is a sectional view schematically showing the manufacturing process of the magnetic recording medium according to the third embodiment.

As shown in FIG. 7B, the Ni fine particles 17 are used as a mask and a pattern is transferred to the second hard mask 8 formed of W to expose the first hard mask 7 in a recess. This process is performed by, for example, the inductively coupled plasma (ICP) RIE apparatus by using a $CF_4/H_2$ gas as a process gas and setting the chamber pressure to 0.1 Pa, coil RF power and platen RF power to 100 W and 30 W respectively, and the etching time to 60 sec.

Figure 7C:
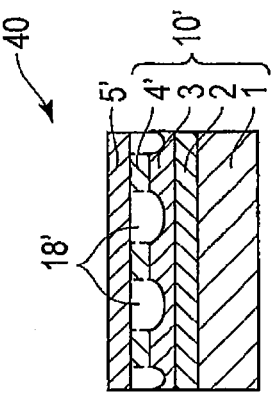
FIG. 7C is a sectional view schematically showing the manufacturing process of the magnetic recording medium according to the third embodiment.

As shown in FIG. 7C, the patterned second hard mask 8 is used as a mask and the first hard mask 7 formed of Cr is etched to transfer a pattern to expose the surface of the lift-off layer 6 in the recess. This process is performed by, for example, an Ar ion milling apparatus by using Ar as a process gas and setting the chamber pressure to 0.04 Pa, plasma power to 400 W, the acceleration voltage to 400 V, and the etching time to 10 sec.

Figure 7D:
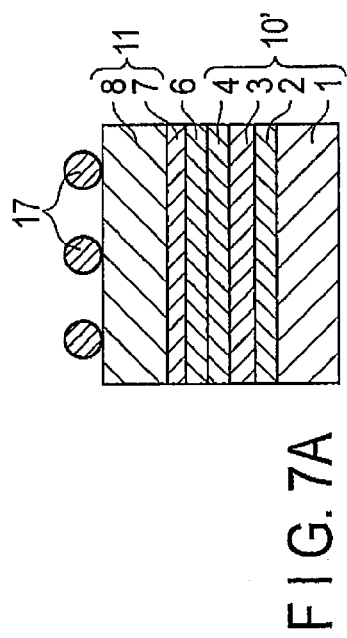
FIG. 7D is a sectional view schematically showing the manufacturing process of the magnetic recording medium according to the third embodiment.

As shown in FIG. 7D, magnetism in a non-recording portion is deactivated via the lift-off layer 6 formed of Mo. In the ion implantation, for example, $P^+$ ions are applied with acceleration energy of 7 keV and the processing time lasts for 30 sec with the dose of up to $10^{16}$ atoms/cm$^2$.

Figure 7E:
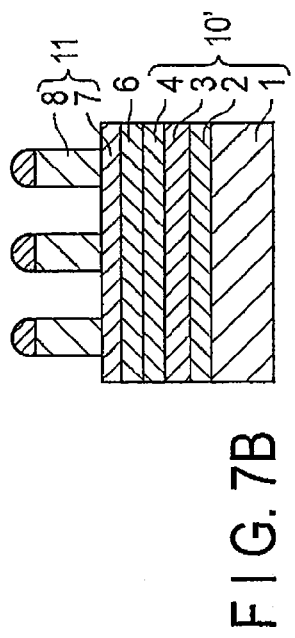
FIG. 7E is a sectional view schematically showing the manufacturing process of the magnetic recording medium according to the third embodiment.

As shown in FIG. 7E, the remaining second hard mask (W) 8 is removed together with the lift-off layer 6 (Mo). This process is performed by, for example, soaking the medium in a hydrogen peroxide solution with a 1% concentration by weight and holding the medium soaked in the solution for 10 min.

Figure 7F:
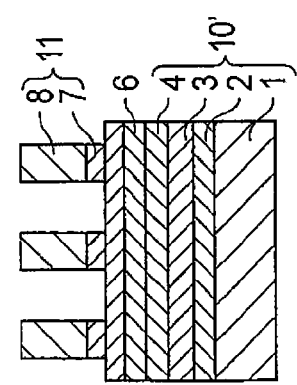
FIG. 7F is a sectional view schematically showing the manufacturing process of the magnetic recording medium according to the third embodiment.

As shown in FIG. 7F, a protective film 5' is formed by CVD (chemical vapor deposition) and a lubricant is applied thereto to obtain a patterned medium 40 according to the third embodiment.

A floating test by mounting a produced patterned medium on a glide tester cleared a floating height of 10 nm. The above result shows that the surface property of a patterned medium according to the third embodiment is excellent.

Example 10

Patterned media are produced by the same method as in Example 1. However, the pattern to be a master is a pattern as shown in FIGS. 3 and 4 formed by EB and CoPt of the thickness of 12 nm is used as the recording layer of the medium in FIG. 3 and CoCrPt—$SiO_2$ of the thickness of 20 nm is used as the recording layer of the medium in FIG. 4. Energy of ion implantation is set to 10 keV and 15 keV by adjusting to the thickness of the medium recording layer. The master pattern is duplicated by the nano imprint method and the pattern is transferred to a UV curable resin by using a stamper formed of transparent resin. Other working methods are the same as in Example 1.

A floating test by mounting a produced patterned medium on a glide tester is carried out and both cleared a floating height of 10 nm. The above result shows that the surface property of a patterned medium produced by the manufacturing method of a magnetic recording medium according to the embodiment is excellent.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A manufacturing method of a magnetic recording medium, comprising:
    forming a lift-off layer, a first hard mask, and a second hard mask formed of a material different from a material of the first hard mask and dissolvable in a same peeling liquid as a peeling liquid that dissolves the lift-off layer, on a magnetic recording medium containing a substrate and a magnetic recording layer provided on the substrate;
    forming a mask layer having a pattern regularly arranged in a longitudinal direction by etching each of the second hard mask, the first hard mask, and the lift-off layer;
    forming a recording portion and a non-recording portion by patterning the magnetic recording layer using the mask layer; and
    peeling the mask layer by subjecting the mask layer to the peeling liquid to dissolve the lift-off layer and the second hard mask simultaneously,
    wherein the material of the lift-off layer and the material of the second hard mask are selected from a group including magnesium, vanadium, manganese, iron, cobalt, nickel, zinc, germanium, arsenic, molybdenum, antimony, tungsten, rhenium, thallium, lead, alloys thereof, and compounds containing 50 at % or more of these elements, and wherein the peeling liquid has a pH value of 3 to 6 and is selected from solutions of a group consisting of hydrogen peroxide, nitric acid, sulfuric acid, phosphoric acid, boric acid, chromic acid, fluoric acid, hydrogen iodide, hydrogen bromide, formic acid, acetic acid, oxalic acid, and mixtures thereof.

2. The method according to claim 1, wherein the material of the lift-off layer and the material of the second hard mask are selected from the group including molybdenum, tungsten, alloys thereof, and compounds containing 50 at % or more of molybdenum or tungsten.

3. The method according to claim 1, wherein the second hard mask has a thickness that is larger than a thickness of the lift-off layer.

4. The method according to claim 1, wherein if the lift-off layer contains at least one element selected from a group including magnesium, vanadium, manganese, zinc, germanium, arsenic, molybdenum, antimony, tungsten, rhenium, thallium, and lead, the material of the first hard mask is selected from a group including aluminum $AlO_x$ (0<x≤3/2), $AlN_x$ (0<x≤1), chrome, $CrO_x$ (0<x≤3/2), $CrN_x$ (0<x≤1), nickel, nickel-tantalum, copper, ruthenium, and compounds thereof.

5. The method according to claim 1, wherein if the lift-off layer contains at least one element selected from a group including iron, cobalt, and nickel, the material of the first hard mask is selected from a group including carbon, $SiO_2$, $CrO_x$ (0<x≤3/2), and $AlO_x$ (0<x≤3/2).

6. The method according to claim 1, wherein the peeling liquid is a solution including hydrogen peroxide.

7. The method according to claim 1, further comprising:

forming a self-organizing material layer on the second hard mask to form a self-organized mask after phase separation of the self-organizing material layer formed on the second hard mask, then using the self-organized mask to form the masking layer having the pattern regularly arranged in the longitudinal direction.

8. The method according to claim 7, wherein the self-organizing material layer comprises polystyrene and polydimethylsiloxane.

9. The method according to claim 7, further comprising:

annealing the substrate to promote phase separation of the self-organizing material layer formed on the second hard mask.

* * * * *